United States Patent [19]

Sladen et al.

[11] Patent Number: 4,784,455
[45] Date of Patent: Nov. 15, 1988

[54] STRAIN RELIEF CONNECTOR FOR OPTICAL FIBER

[75] Inventors: Francis Sladen, Neshanic Station; Peter Garner, Flemington; Tadeusz Szostak, Jackson, all of N.J.

[73] Assignee: Thomas & Betts Corporation, Bridgewater, N.J.

[21] Appl. No.: 359,141

[22] Filed: Mar. 17, 1982

[51] Int. Cl.$^4$ .................... G02B 6/36; G02B 7/26
[52] U.S. Cl. ............................................. 350/96.20
[58] Field of Search .................... 350/96.20, 96.23; 174/161, 162, 163, 164

[56] References Cited

U.S. PATENT DOCUMENTS

| | | | |
|---|---|---|---|
| 3,871,744 | 3/1974 | Bridger et al. | 350/96 |
| 3,883,681 | 5/1975 | Campbell | 174/65 |
| 3,937,559 | 2/1976 | Ferrentino | 350/96 |
| 3,955,878 | 5/1976 | Nowak | 350/96 |
| 3,982,060 | 9/1976 | Avery et al. | 174/75 |
| 4,028,081 | 6/1977 | Marcatili | 65/2 |
| 4,039,248 | 8/1977 | Franke et al. | 350/96 |
| 4,045,121 | 8/1977 | Clark | 350/96 |
| 4,047,797 | 9/1977 | Arnold et al. | 350/96 |
| 4,146,302 | 3/1979 | Jachimowicz | 350/96.23 |
| 4,148,559 | 4/1979 | Gauthier | 350/96.21 |
| 4,171,867 | 10/1979 | Cocito | 350/96.21 |
| 4,178,069 | 12/1979 | Andersen et al. | 350/96.23 |
| 4,184,860 | 1/1980 | Schneider et al. | 65/3 |
| 4,195,468 | 4/1980 | King et al. | 57/9 |
| 4,205,899 | 6/1980 | King et al. | 350/96.23 |
| 4,229,068 | 10/1980 | Hodge et al. | 350/96.20 |
| 4,232,935 | 11/1980 | Rohner et al. | 350/96.23 |
| 4,252,405 | 2/1981 | Oldham | 350/96.22 |
| 4,309,071 | 1/1982 | Prunier | 350/96.21 |

FOREIGN PATENT DOCUMENTS 0022036 1/1981 European Pat. Off. ......... 350/96.20

Primary Examiner—William L. Sikes
Assistant Examiner—Robert E. Wise
Attorney, Agent, or Firm—Robert M. Rodrick; Salvatore J. Abbruzzese

[57] ABSTRACT

An optical fiber connector which provides strain relief. The connector provides for retaining a predetermined fiber extent between two longitudinal distant points along the fiber. The connector comprises two movable securement members which reduces the distance between two secured points of fiber while maintaining a fixed longitudinal extent.

23 Claims, 3 Drawing Sheets

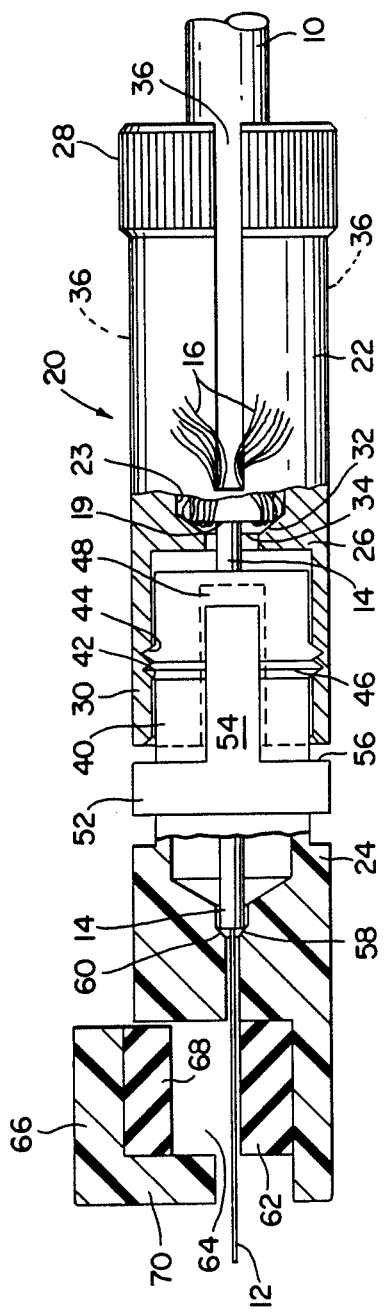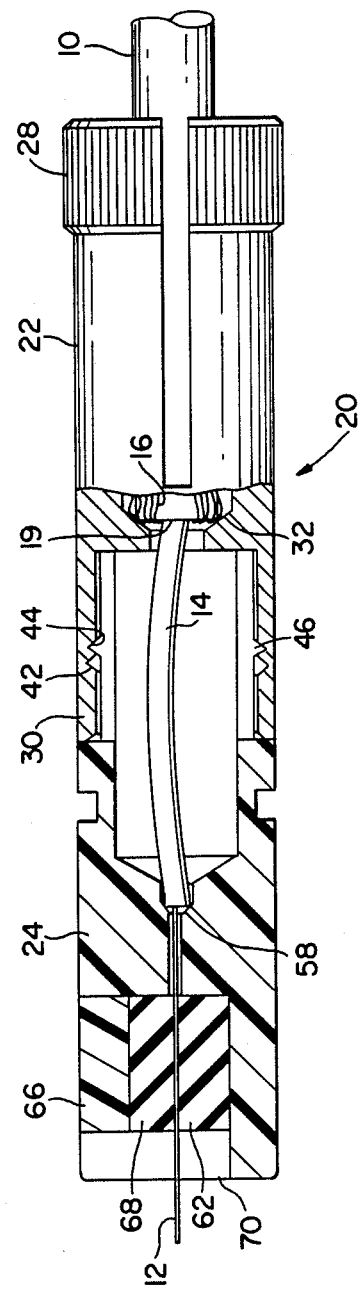

STRAIN RELIEF CONNECTOR FOR OPTICAL FIBER

FIELD OF THE INVENTION

This invention relates to optical fiber terminations and more particularly pertains to providing strain relief for optical fiber in an optical fiber connector.

BACKGROUND OF THE INVENTION

When employing optical cable, which typically includes optical fiber having core and cladding surrounded by some form of sheathing, there may be the necessity to run or suspend the cable between two longitudinal distant sections. Such is the case in optical terminations and connections. In addition, most cable structures will often be exposed to tensile loads placed thereon. Any physical stress placed on the cable by such loads will be transmitted to the fiber itself. This transmitted stress, which may be a part of normal handling of the cable or the result of the aforementioned axial loads placed thereon, could cause damage to the fiber, resulting in a decrease or possible total loss of optical transmission capability.

In order to reduce the amount of stress transmitted from the jacketed cable to the fiber, it is known to provide excess fiber within the cable. This excess fiber may be formed by periodically providing fiber slack within the cable to allow a certain amount of "give", thereby preventing equivalent tensile stress from being transmitted from the cable, to the fiber. While transmited stress will be substantially reduced in this manner, it will not be totally prevented. Repeated or continuous stress caused by an axial load may tend to be transmitted, to a limited degree, to the fiber, thereby affecting the quality of optical transmission. Further, this type of strain relief must be provided for during fiber construction and cannot be provided during subsequent use.

Beyond the above, the optical termination art has seen alternative connector structures which attempt to provide for strain relief in optical cable by providing excess fiber within the connector itself. Optical fiber cable, regardless of previous provisions for strain relief in the cable, could be terminated in a connector which by providing excess therein, reduces the transmitted stress to the fiber. Such a connector is set forth in U.S. Pat. No. 3,871,744 issued Mar. 18, 1975. This patent discloses an optical fiber connector which provides excess cable within the terminating structure for strain relief. The structure employs a removable thumb screw which can be internally rotated to bear transversely against the fiber, thereby "bowing" the fiber and providing excess fiber within the connector. This method of providing strain relief requires "blind" contacting of the fiber with the thumb screw. Overinsertion of the screw may cause damage to the optical fiber, while underinsertion will fail to produce the desired results.

It is desirable to provide an improved optical fiber connector which can be easily and inexpensively manufactured and which will provide strain relief by allowing for excess fiber within the cable assembly. It is also desirable to provide such excess without the need to bear transversely against the fiber in order to minimize or eliminate the possibility of damage to the fiber.

SUMMARY OF THE INVENTION

It is an object of the present invention to provide an optical element termination which provides strain relief for the optical element.

It is a more particular object of the invention to employ an optical element connector which provides for retaining a predetermined fiber extent between two longitudinally distant points along the element to reduce stress transmitted from the cable to the fiber.

In the attainment of these and other objects, the invention as shown in the preferred embodiment, looks toward providing an optical cable connector which holds at two longitudinally distant points, a predetermined extent of optical element in respective members.

Relative longitudinal movement is provided between the members, which reduces the distance between two secured points of fiber, while maintaining a fixed longitudinal extent. Axial loads placed on the cable will be accommodated by this fixed fiber extent, without damage thereto.

This structure is made of relatively few parts, and is easy to assemble and install. As against the prior art apparatus, the invention contemplates providing excess fiber by means of the connector itself without having to transversely bear against the fiber.

Other objects and features of the present invention will be evident from the following detailed description of the preferred embodiments and from the drawings.

BRIEF DESCRIPTION OF THE DRAWINGS

FIG. 3 is the connector of FIG. 2 partially in section, shown in the extended position with the cable inserted therein.

FIG. 4 is the connector of FIG. 3 shown in the inserted position with the fiber bowed for strain relief.

DETAILED DESCRIPTION OF THE PREFERRED EMBODIMENTS

Figure 1:
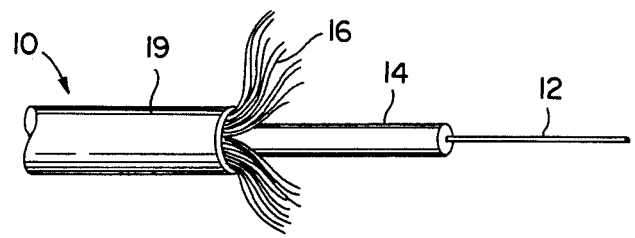
FIG. 1 shows in perspective, the optical fiber cable prepared for use in the strain relief connector of the present invention.

FIG. 1 shows a conventional optical cable assembly 10, having a fiber 12 comprising an optical core surrounded by cladding for the transmission of light. The cable assembly further includes a buffer 14, typically made of plastic which surrounds the fiber. A plurality of strands of strengthening members 16, which in the present embodiment are of the type sold under the DuPont trademark, KEVLAR, extend lengthwise along and over the buffer 14. An outer plastic jacket 19 surrounds and completes the cable assembly 10.

To employ the connector of the present invention, the outer jacket 19 is stripped away from a longitudinal end segment of the cable. A length of strengthening members 16, typically about ¾ inch, (1.91 cm.) is left exposed to extend past the severed end of the outer jacket. Approximately 3½ inches (8.89 cm.) of buffered fiber 14 thereupon extends from the jacketed cable with an extent of bared fiber 12 thereafter. With the cable assembly 10 so prepared, it may be inserted into the strain relief connector 20, as illustrated in FIG. 2.

Figure 2:
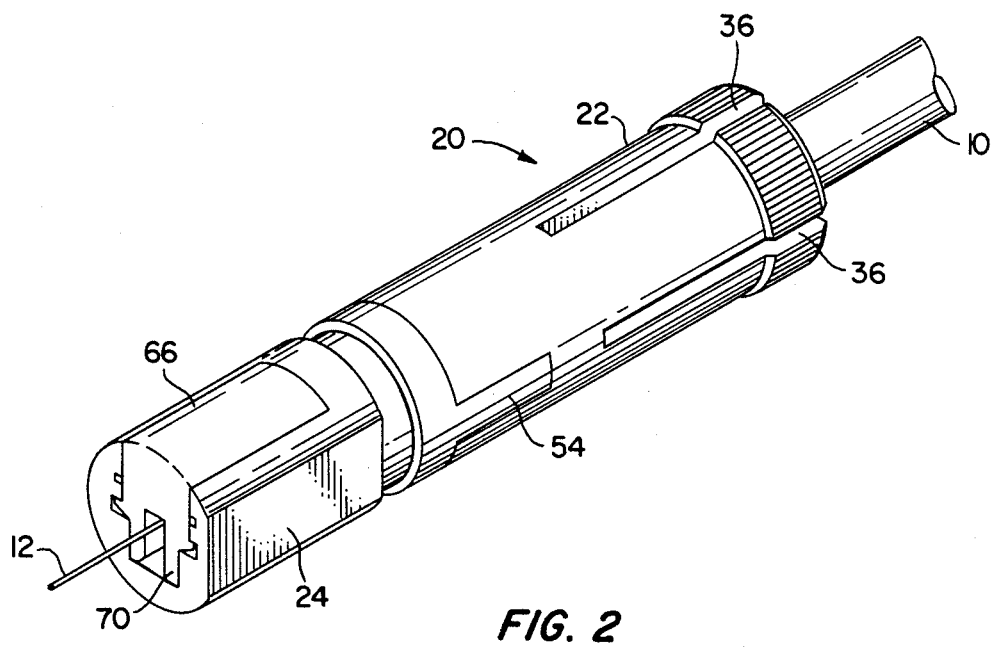
FIG. 2 shows in perspective, the strain relief connector of the present invention.

As shown in FIG. 2, the strain relief connector 20 is an elongate, generally cylindrical member which receives the prepared end of the cable assembly 10 for connection with a further opto-electric device (not shown). The connector 20 includes a hollow cylindrical sleeve 22 at one end and a generally cylindrical fiber guide 24 at the other. The sleeve 22 engages and secures the jacketed portion of the cable assembly 10, while fiber guide 24 secures the buffered portion 14, adjacent the bared fiber 12. The sleeve 22 and guide 24 are constructed to provide relative sliding movement therebetween. Such movement inward along the longitudinal axis, while two longitudinally distant extents of buffered fiber are respectively held in the guide 24 and sleeve 22, will form a bow in the buffered portion 14 and thereby provide strain relief within the connector 20 as will be detailed hereinbelow.

Referring now to FIG. 3, the connector 20, shown partially in section, includes cylindrical sleeve 22 being preferably formed of metal, having a central passage 23 therethrough. A transverse wall 26 divides the sleeve into an outer section 28 and an inner section 30. The inner diameter of outer section 28 is less than the inner diameter of inner section 30, so as to provide for retentive receipt of the cable jacket 19. The cable assembly 10 prepared as described above, is inserted into the outer section 28 of sleeve 22 until the edge of jacket 19 abuts against a tapered stop surface 32, formed on transverse wall 26. Opening 34 in transverse wall 26, allows the smaller diametered buffered portion 14 of cable assembly 10 to pass therethrough. Upon insertion of cable assembly 10 into sleeve 22, strengthening members 16 are forcibly folded back along a longitudinal extent of jacket 19. In order to accommodate the folded strengthening members 16, four equally spaced, circumferentially disposed longitudinal splines 36 extend from the outer edge of outer section 28. These splines 36 which extend to communicate with the longitudinal passage of sleeve 22, accept the strengthening members 16 which are pulled therethrough and project outwardly from the sleeve 22.

Inwardly extending from transverse wall 26, is cylindrical inner section 30, the inner diameter of which receives the cylindrical insertion portion 40 of fiber guide 24. In order to retentively receive insertion portion 40 and to provide longitudinal movement, the inside wall of inner section 30 includes a pair of adjacent annular grooves 42 and 44. These grooves receive a corresponding annular rib 46 on the outer wall of insertion portion 40. Fiber guide 24 is then movable from a first position with rib 46 in groove 42 to a second position, with rib 46 in groove 44. Also, included on insertion portion 40, is a pair of diametrically opposed longitudinal tongues 48 which extend from central portion 52 of fiber guide 24. Tongues 48 engage a corresponding pair of diametrically opposed longitudinal rails 54 extending from the edge of inner section 30 of sleeve 22. The receptive relation of tongues 48 and rails 54 allow for slidable longitudinal movement between sleeve 22 and fiber guide 24, but prevent rotational movement therebetween.

Central portion 52 of guide 24 forms an annular shoulder 56 which is disposed adjacent the internal surface of inner section 30 when fiber guide 24 is moved to the second position forming thereby a mechanical stop. Shoulder 56 thus prevents overinsertion, which could cause damage to the buffered fiber 14.

In first position with rib 46 in groove 42, buffered portion 14 of cable 10 extends linearly through the central passage 23 of connector 20 until the outer edge of the buffer 14 abuts or is disposed closely adjacent to a frusto-conical neck 58 formed internally within guide 24. A smaller diametrical opening 60 allows the fiber 12 to pass therethrough. In this position the buffered portion 14 is confined between frusto-conical neck 58 at one end, and stop surface 32 at the other. Ideally constructed, the edge of buffered portion 14 will abut against frusto-conical neck 58, while the edge of jacketed portion 19 will seat against stop surface 32. However, due to manufacturing limitation, such precision may not be achievable. Therefore, there may be a slight gap between the edge of buffered portion 14 and the frusto-conical neck 58. As will be described hereinbelow, fiber guide 24 is movable from its first position to its second position, a distance greater than the gap between neck 58 and buffered portion 14, and thus will compensate for this gap.

Fiber 12 continues longitudinally from opening 60 supported on rectangular base pad 62 which is seated in a centrally located channel 64 at the outer extent of connector 20 opposite cable insertion end 30. Pad 62, which is made of rubber or other resilient material, prevents downward bending of fiber 12.

A rectangular plug 66, including depending movable upper pad 68, snap fits into channel 64 to support from above the fiber 12. Upper pad 68 and base pad 62 retain fiber 12 in fixed linear alignment along the longitudinal axis of connector 20. A pronged portion 70 depends below upper pad 68 at the outer edge of plug 66. Pronged portion 68 secures and positions the extending fiber 12 for ultimate connection.

The operation of the strain relief connector can best be described with reference to FIGS. 3 and 4, the latter showing the connector in the desired strain relief position.

As previously described, with fiber guide 24 being in first position, i.e., having rib 46 in first groove 42, and plug 66 in a non-engaged position with respect to channel 64, cable 10 prepared as above described is inserted into sleeve 22 at outer extent 28. Jacketed portion 19 will abut against stop surface 32 with buffered portion 14 continuing through the connector passage. Strengthening members 16 folded back along jacket 19 during insertion, are pulled out manually through splines 36. Buffered portion 14 abuts against or is closely adjacent to frusto-conical neck 58 so that only fiber 12 extends externally of connector 10. In this position, the buffered portion 14 is confined between stop surface 32 and frusto-conical neck 58.

The connector 20 is then repeatedly rotated about the cable, winding the strengthening members 16 around jacket 19, thereby pulling them back through splines 36 and securely wedging such strengthening members 16 between the cable jacket 19 and the internal wall of sleeve 22. This wedging action securely retains through friction the cable assembly 10 in a fixed axial position relative to the sleeve 22. It should be appreciated that other cable assembly securement means may be utilized in the practice of the invention. Plug 66 may then be snapped into channel 64 so that pads 62 and 68 provide adequate support and positioning to the extending fiber 12.

Fiber guide 24 can now be moved from the first position to the second position by suitably inwardly pushing guide 24 into sleeve 22. This will snap rib 46 from groove 42 to groove 44. This movement reduces the distance between frusto-conical neck 58 and stop surface 32, between which points buffered portion 14 is confined, thereby forcing buffered portion 14 against frusto-conical neck 58 if it is not already so disposed, and then bowing buffered portion 14 to compensate for the reduced distance.

The bow in buffered portion 14 provides strain relief for the cable assembly 10 within the connector. Excess fiber being provided between the fixed points in the connector, axial stress placed on the cable will not be transferred to the fiber.

The present embodiment functions to provide "excess" fiber in the form of slack within the cable connector; axial loads placed on the cable will "pull-out" the slack rather than break or damage the cable. However, once the slack is pulled out by application of an axial load to the cable, further such loads may then cause damage to the fiber.

Figure 5:
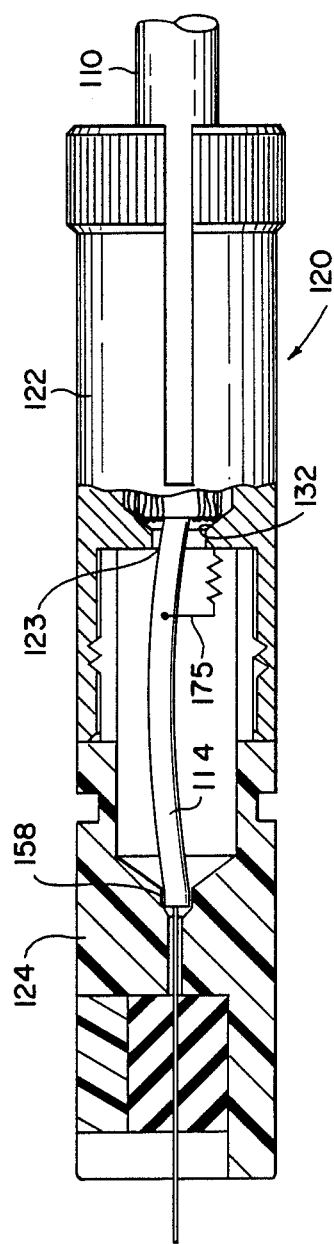
FIG. 5 is a side elevation view, partially in section, showing an alternate embodiment of the present invention.

An alternate embodiment, which provides for retention of slack, is shown in FIG. 5. As the embodiment of FIG. 5 is similar to that of FIGS. 1–4, similar references numerals will be used to denote like parts, with 100 being added to the reference numerals of FIGS. 1–4.

The present modification relates to a spring member 175, which is shown schematically in FIG. 5, and is interposed into the passage 123 of connector 120 between stop surface 132 and frusto-conical neck 158. Spring member 175 is suitably secured to a third point of buffered portion 114 intermediate of the above-mentioned points and provides springback for buffered portion once the slack is removed. In this manner, the buffered portion 114 will return to a position shown in FIG. 5 (with "excess" fiber provided) after the axial load that has been applied to the cable is removed. When the axial load is applied, spring 175 will compress, after the load is relieved, the spring will return to normal position thereby bowing the fiber.

The above-described embodiments disclose slidable movement between fiber guide 24 and sleeve 22, in order to reduce the distance therebetween, however, the present invention contemplates other methods and devices of providing such movement. As an example, the sleeve 22 and guide 24 can be screw-threaded for rotative inward movement.

The present invention as described above, with respect to the preferred embodiments, provides strain relief in the form of a bowed fiber within the connector structure itself. However, it is within the contemplation of the present invention to provide for strain relief within the optical fiber assembly wherein to some degree the fiber is longitudinally movable within the jacket. Such strain relief may be accomplished by providing an additional length of fiber within some extent of the jacketed portion, not necessarily within the connector itself but provided by the connector. As above described with references to FIG. 1, buffered fiber 14 is surrounded by KEVLAR strengthening member 16 and then surrounded by an outer jacket 19. As strengthening members 16 are tightly wound about buffer 14, friction between the buffered fiber 14, strengthening members 16 and jacket 19 will at some point along the cable, secure buffer 14 within the jacket 19, preventing axial movement. Thus, upon inward longitudinal movement of the extending buffer 14, the buffer will bow between the point at which it is inwardly pushed and some frictional securement point along the assembly.

The particularly described embodiments are disclosed by way of example and illustration and are not intended to limit the scope of the invention. The scope of the invention is set forth in the appending claims.

What is claimed is:

1. A connector for an elongate optical element comprising:
   a first member for engaging said element at a first location;
   a second member for engaging said element at a second location longitudinally spaced from said first location and defining thereby a predetimined extent of element, said predetermined extent being substantially equal to said longitudinal spacing between said first and second location, said first and second members being disposed for relative movement therebetween; and
   means for changing the longitudinal spacing between said first location and said second location and for retaining said predetermined element extent upon relative movement of said first and second members whereby said predetermined elements extent exceeds the longitudinal spacing between said first and second locations.

2. The connector in accordance with claim 1 wherein said first member slideably engages said second member and said longitudinal spacing changing means includes said slideable movement of said first member with respect to said second movement.

3. The connector in accordance with claim 1 wherein said element is retained at a third location intermediate of said first and second locations and wherein said third location securement includes means for resiliently retaining said predetermined element extent in excess of said longitudinal spacing between said first and second member.

4. The connector in accordance with claim 3 wherein said resiliently retaining means includes a spring suitably attached to said element, said spring being biased to return said excess element within said connector.

5. The apparatus in accordance with claim 1 wherein said fiber guide is movable from a first position longitudinally distant said sleeve to a second position longitudinally proximate of said sleeve.

6. The apparatus in accordance with claim 5 including means for preventing axial rotation of said fiber guide with respect to said sleeve.

7. The apparatus in accordance with claim 5 wherein said cable includes fibrous strengthening members extending from said outer jacket between said jacket and said buffered portion; and
   said cable retentive receiving means includes said strengthening members.

8. The apparatus in accordance with claim 7 wherein said elongate sleeve includes at said one end at least one spline extending longitudinally along said sleeve, said spline communicating with said passage for accommodating said fibrous strengthening members therethrough, said strengthening members wedging said cable in said sleeve upon relative rotation of said sleeve about said cable.

9. A connector for fiber optic cable having an optical fiber extending from a protective sheath, said connector comprising:
   a first member, including a first means for securing an extending portion of said optical fiber;
   a second member, including a second means for securing a sheathed portion of said optical fiber, said second member coupled to said first member; for relative movement therebetween, said first and second securing means defining a predetermined extent of fiber therebetween;

means for reducing the spacing between said first securing means and said second securing means, and for retaining said predetermined extent of fiber upon said relative movement of said first and second members.

10. The combination in accordance with claim 9 wherein said spacing reducing means includes movement of said first member from a first position distal to said second member to a second position proximal of said second member.

11. The connector in accordance with claim 10 wherein said fiber includes a buffered portion extending from an outer edge of said cable sheath, with a longitudinal section of said fiber extending from the outer edge of said buffered portion.

12. The connector in accordance with claim 11 wherein said second securing means includes a stop surface for retaining said outer edge of said cable sheath, said stop surface including a first opening for passage of said buffered portion, and means for retentively holding said outer sheath edge against said stop surface.

13. The connector in accordance with claim 12 wherein said first securing means includes a neck portion for retaining said outer edge of said buffered portion, said neck portion including a second opening for passage of said fiber.

14. The connector in accordance with claim 13 wherein said spacing reducing means includes bowing said buffered portion secured between said neck portion and said stop surface, upon proximal movement of said first member.

15. The combination in accordance with claim 12 wherein said cable includes a layer of fibrous strengthening members between said sheath and said buffered portion, said fibrous strengthening member extending from said outer edge of said sheath, back over a longitudinal portion of said sheathed cable; and said retentive holding means includes said fibrous strengthening members wound around said sheathed cable, thereby wedging said cable in said second member.

16. An apparatus for terminating a fiber optic cable having a fiber extending from a buffered portion which extends from an outer jacket, said apparatus comprising:

an elongate sleeve having a passage therethrough including means for retentive receipt of said cable;
an elongate fiber guide having a passage therethrough said fiber guide coupled to the said sleeve and including means for retentively receiving said buffered portion of said cable;
means for providing relative movement between said fiber guide and said sleeve; and
means for reducing the spacing between said fiber guide and said sleeve.

17. The apparatus in accordance with claim 16 including a fiber support member adjacent the other end of said fiber guide for supporting said extending fiber.

18. A method of providing strain relief for an optical element in a connector comprising the steps of:

securing a first portion of said element in a first member of said connector;
securing a second portion of said element, longitudinally spaced from said first portion, in a second member of said connector, thereby defining secured longitudinal extent of element between said first and second portion;
moving one of said first and second members relatively toward the other thereby reducing the distance between said first and second securement portions.

19. The method in accordance with claim 18 wherein said moving step comprises slidably engaging said first member with said second member.

20. The method in accordance with claim 18 further comprising:

resiliently securing said element at a third portion intermediate of said first and second portions, said third portion securement resiliently retaining said longitudinal extent of said element between said first and second member.

21. An apparatus for providing strain relief in an optical element assembly, including a fiber movable therewithin and extending from an outer jacket a predetermined extent, said apparatus comprising:

a first member for securing said fiber at a first location;
a second member for securing said jacket at a second location spaced from said first location;
means for reducing the longitudinal spacing between said first and second locations and thereby moving a portion of said fiber into said jacket increasing the fiber length therewithin.

22. The apparatus in accordance with claim 21 wherein said first member slideably engages said second member and said longitudinal spacing, reducing means includes said slideable movement of said first member with respect to said second member.

23. The apparatus in accordance with claim 21 wherein said fiber is secured at a third location along said assembly, and wherein said third location securement includes means for resiliently retaining said additional amount of fiber within said jacket.

* * * * *